(12) United States Patent
Kang et al.

(10) Patent No.: US 6,905,157 B2
(45) Date of Patent: Jun. 14, 2005

(54) ENDGATE FOR A PICKUP TRUCK

(75) Inventors: Paul W. Kang, Auburn Hills, MI (US); Greg Flynn, Auburn Hills, MI (US); Thomas M. Lobkovich, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/674,129

(22) Filed: Sep. 29, 2003

(65) Prior Publication Data

US 2005/0067851 A1 Mar. 31, 2005

(51) Int. Cl.[7] .............................................. B62D 33/03
(52) U.S. Cl. ....................................... 296/55; 296/57.1
(58) Field of Search .............................. 296/50, 51, 55, 296/57.1; 160/217

(56) References Cited

U.S. PATENT DOCUMENTS

| | | | | |
|---|---|---|---|---|
| 423,189 A | * | 3/1890 | Steuerwald et al. .......... | 296/51 |
| 1,023,617 A | * | 4/1912 | Botteese ....................... | 296/32 |
| 5,104,172 A | * | 4/1992 | Schildt ......................... | 296/50 |
| 5,232,260 A | * | 8/1993 | Lippard ........................ | 296/51 |
| 5,486,032 A | * | 1/1996 | Reed et al. ................... | 296/50 |
| 5,597,195 A | * | 1/1997 | Meek ........................... | 296/61 |
| 5,931,519 A | * | 8/1999 | Jeffers et al. ............... | 296/57.1 |
| 5,992,918 A | | 11/1999 | Gobart et al. .......... | 296/147.13 |
| 6,068,327 A | | 5/2000 | Junginger .............. | 296/146.13 |
| 6,149,219 A | * | 11/2000 | Schambre et al. ......... | 296/57.1 |
| 6,364,392 B1 | * | 4/2002 | Meinke ........................ | 296/62 |
| 6,435,596 B1 | | 8/2002 | Pyo ............................ | 296/106 |

* cited by examiner

Primary Examiner—D. Glenn Dayoan
Assistant Examiner—Paul Chenevert
(74) Attorney, Agent, or Firm—Laura C. Hargitt

(57) ABSTRACT

An endgate for a pickup truck includes a lower portion movably mountable with respect to the body of the pickup truck. An upper portion of the endgate is movably mounted with respect to the lower portion to selectively alter the height of the endgate for improving access to the cargo bed of the pickup truck. The endgate preferably includes gooseneck hinges to pivotably interconnect the lower portion and the upper portion, and an electric latch and striker to selectively prevent their relative movement.

12 Claims, 3 Drawing Sheets

ENDGATE FOR A PICKUP TRUCK

TECHNICAL FIELD

This invention relates to endgates for pickup trucks that have a lower portion and an upper portion selectively movable with respect to the lower portion to alter the height of the endgate to facilitate access to a cargo box.

BACKGROUND OF THE INVENTION

A pickup truck typically employs an endgate at the open end of the cargo box. A prior art endgate is typically a rigid member pivotably connected to the body of the pickup truck for movement between a closed position in which the endgate closes off the open end to retain cargo inside the cargo box, and an open position in which the endgate projects rearward from the pickup truck.

SUMMARY OF THE INVENTION

An endgate for a pickup truck characterized by a cargo box includes a lower portion partially defining the endgate and an upper portion further defining the endgate. The lower portion is movably mountable with respect to the pickup truck for movement between an open position and a closed position. The upper portion is operatively connected to the lower portion and selectively movable with respect to the lower portion to alter the height of the endgate when the lower portion is in the closed position. The endgate provides increased flexibility in endgate configuration, enabling a user of a pickup truck to reduce the distance the user must reach to access the cargo box.

In the preferred embodiment, the lower portion is pivotably mountable with respect to the truck, and the upper portion is pivotably connected to the lower portion by at least one gooseneck hinge. A first electric latch on the lower portion is engageable with a striker on the pickup truck to retain the lower portion in the closed position. A handle on the upper portion selectively causes the first latch to disengage, permitting the lower portion to pivot relative to the cargo box. The first electric latch enables the handle to be located on the upper portion at a conventional handle height without the need for rigid latch rods extending between the lower portion and the upper portion. Similarly, a second electric latch on the lower portion is engageable with at least one striker on the upper portion to prevent relative motion between the lower portion and the upper portion. A switch on the upper portion selectively causes disengagement of the second electric latch from the striker to allow the upper portion to pivot independently of the lower portion. The second electric latch enables the switch to be located on the upper portion without the need for rigid latch rods between the lower portion and the upper portion.

The above features and advantages, and other features and advantages of the present invention are readily apparent from the following detailed description of the best mode for carrying out the invention when taken in connection with the accompanying drawings.

DESCRIPTION OF THE PREFERRED EMBODIMENT

Figure 1:
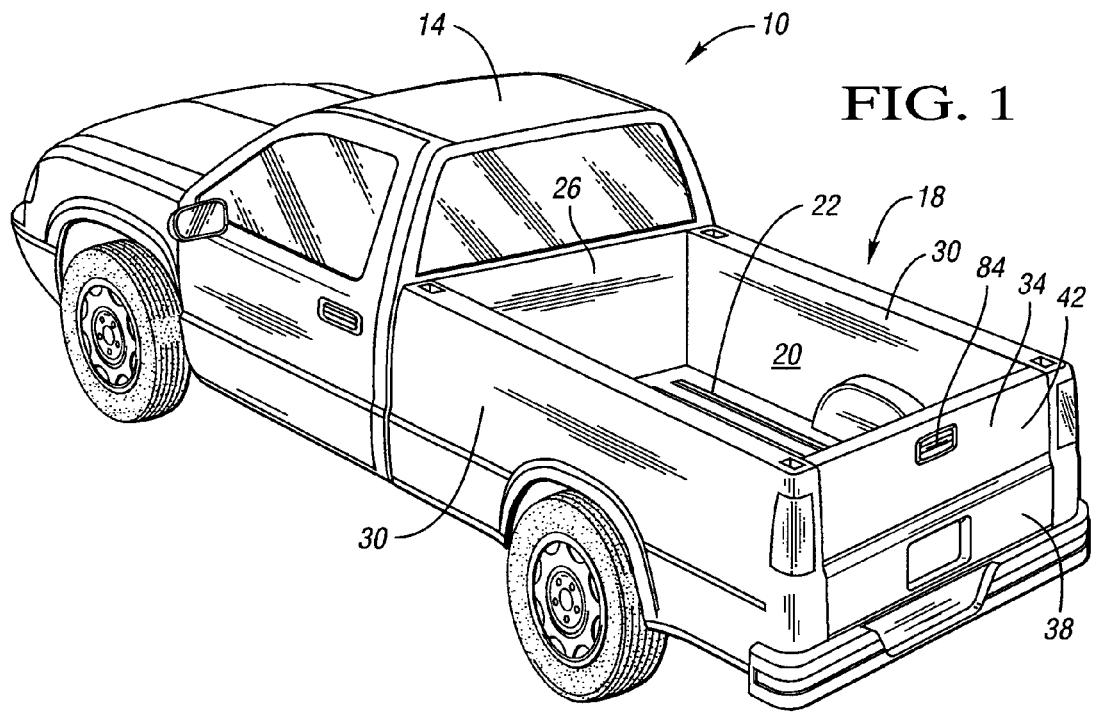
FIG. 1 is a schematic perspective view of a pickup truck with an endgate having a lower portion and an upper portion.
Figure 2:
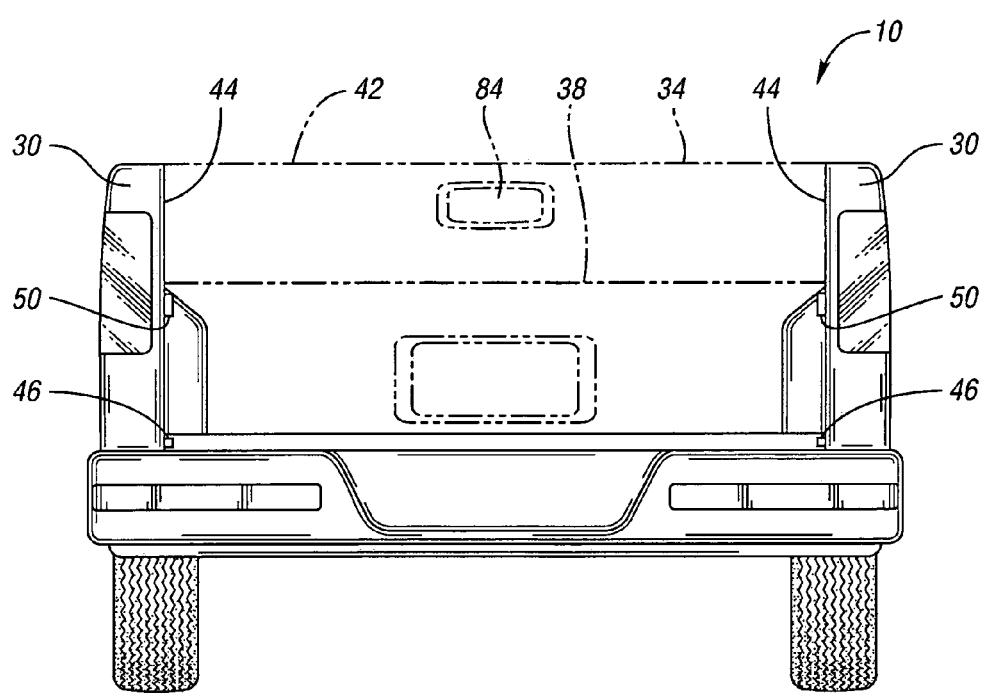
FIG. 2 is a rear schematic view of the pickup truck of FIG. 1.

Referring to FIG. 1, a pickup truck 10 includes a cab 14 and a cargo box 18. The cargo box 18 defines a cargo area 20, and is at least partially formed by a box floor 22, a front wall 26, and two sidewalls 30. An endgate 34 is pivotably mounted at one end of the cargo box 18. The endgate 34 includes a lower portion 38 and an upper portion 42. Referring to FIG. 2, the sidewalls 30 cooperate to at least partially form an endgate opening 44. Hinges 46 at the lower portions of the sidewalls pivotably connect the lower portion 38 to the cargo box 18. A striker 50 on each of the sidewalls 30 engages a latch, depicted at 78A in FIGS. 3 and 4, in the lower portion 38 to retain the lower portion in a closed position as shown in FIGS. 1 and 2. The lower portion 38 and the upper portion 42 extend substantially from one sidewall to the other and substantially fill the endgate opening 44 when the endgate 34 is fully closed.

Figure 3:
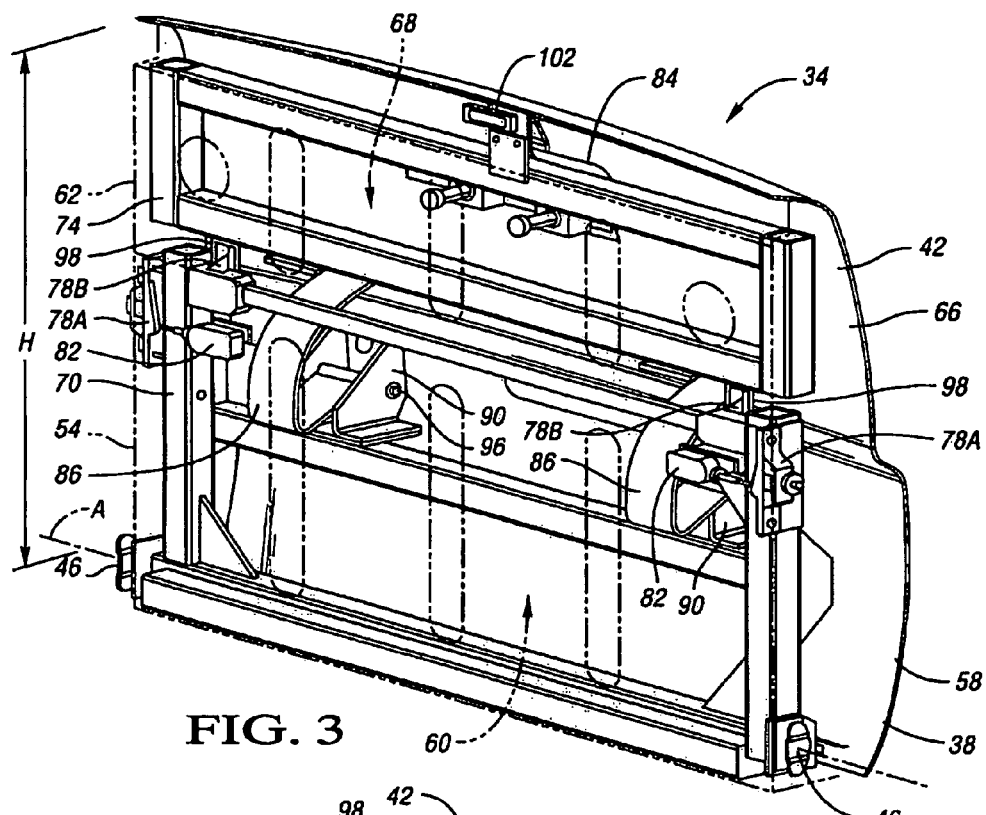
FIG. 3 is a perspective schematic view of the endgate of FIG. 1 with the upper portion in a first position with respect to the lower portion.

Referring to FIG. 3, wherein like reference numbers refer to like components from FIGS. 1 and 2, the lower portion 38 of the endgate includes an inner panel 54 and an outer panel 58 defining a cavity 60 therebetween. The upper portion 42 similarly includes an inner panel 62 and an outer panel 66 defining a cavity 68 therebetween. The lower portion 38 and the upper portion 42 each include a structural frame 70, 74 within their respective cavities 60, 68 for supporting hardware and providing structural rigidity. Structural frames 70, 74 are comprised of a plurality of tubular members welded to one another. Those skilled in the art will recognize a variety of structural elements that may be employed within the scope of the claimed invention to provide structural rigidity to the lower portion and the upper portion. For example, one or more stamped reinforcement members welded to the inner panel or the outer panel may be employed instead of tubular members.

Latches 78A are operatively connected to the structural frame 70 of the lower portion and are sufficiently positioned to engage the strikers 50 on the pickup truck sidewalls. The latches 78A are electronically actuated by solenoids 82 and are operatively connected to a handle 84 on the upper portion by wires (not shown) that extend between the lower portion and the upper portion. The handle 84 is a device that is operable to selectively cause disengagement of latches 78A from strikers 50. A pair of gooseneck hinges 86 operatively interconnects the lower portion 38 and the upper portion 42 such that the upper portion is pivotable with respect to the lower portion. In the embodiment depicted, two hinge brackets 90 are mounted to the structural frame 70 within cavity 60. Each hinge bracket 90 supports a pivot pin 96 about which one of the gooseneck hinges 86 is pivotable on a horizontal pivot axis.

The upper portion 42 includes strikers 98 engageable with electronically-actuated latches 78B mounted to frame 70 within cavity 60. When the strikers 98 are engaged with the latches 78B, as depicted in FIG. 3, the upper portion is not free to pivot with respect to the lower portion; the lower portion and the upper portion are substantially rigidly connected. The upper portion is in a first position with respect to the lower portion such that the endgate extends to a height H. In the context of the present invention, the "height" of the endgate is the vertical distance between pivot axis A, about which the lower portion 38 pivots with respect to the cargo box between the closed position and an open position, and the uppermost extent of the endgate 34 when the lower portion 38 is in the closed position.

Figure 4:
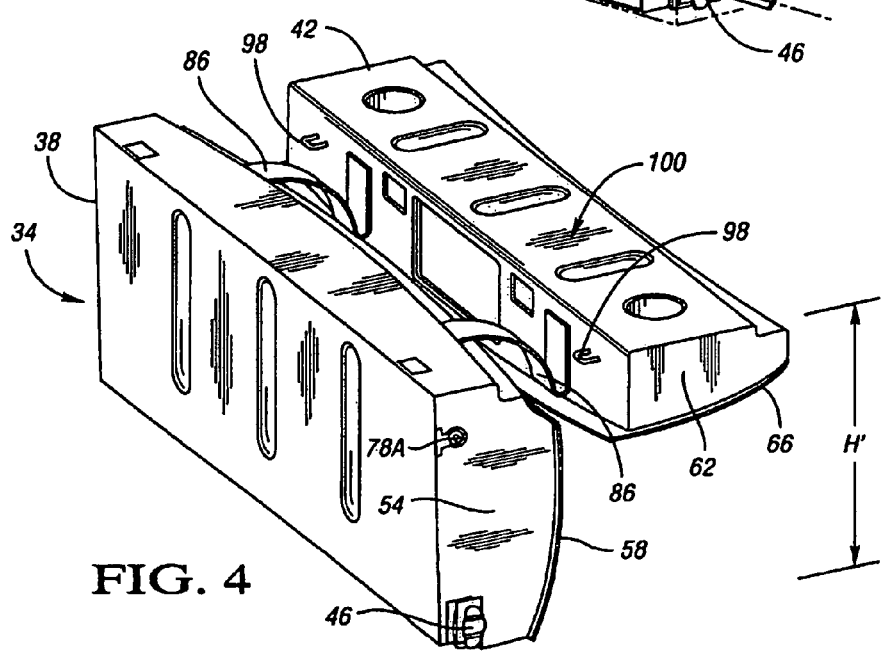
FIG. 4 is a perspective schematic view of the endgate of FIG. 1 with the upper portion in a second position with respect to the lower portion.

A device, e.g., a push-button switch 102, on the upper portion 42 is operatively connected to latches 78B by wires (not shown) extending between the lower portion and the upper portion to cause selective disengagement of the strikers 98 form the latches 78B. When the strikers 98 and the latches 78B are disengaged from one another, the upper portion is free to pivot independently of the lower portion to a second position perpendicular to the lower portion, as shown in FIG. 4. The endgate 34 extends to a height H', which is less than height H. A portion 100 of the surface of inner panel 62 is preferably substantially flat and oriented horizontally when the upper portion is in the second position in order to provide a horizontal working surface. It may be desirable for the surface portion 100 to be at the same height as the wheel wells in the cargo box when the upper portion is in the second position so that a large load may be supported by the wheel wells and the surface portion 100.

Figure 5:
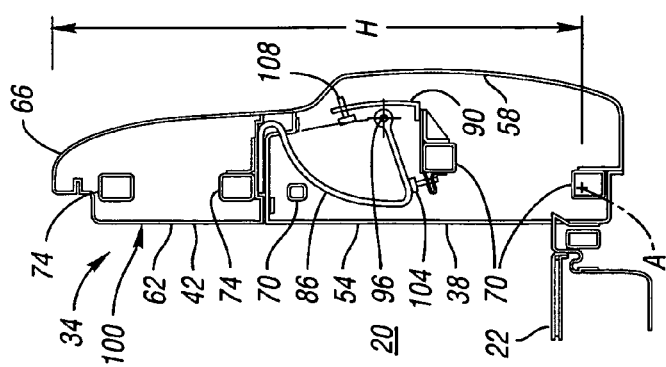
FIG. 5 is a side cross-sectional schematic view of the endgate of FIG. 1 in a fully closed position.

Referring to FIG. 5, wherein like reference numbers refer to like components from FIGS. 1–4, the endgate 34 is depicted in a fully closed position in which the lower portion and the upper portion are each at least partially located within the endgate opening (not shown). The lower portion 38 is engaged with the strikers (not shown) on the sidewalls of the pickup truck, and the upper portion is in the first position with respect to the lower portion. The portion 100 of the surface of inner panel 62 faces the cargo area 20. The height H of the endgate is sufficient for the endgate to substantially fill the endgate opening to retain cargo in the cargo box. Stop members 104, 108 are mounted to the frame 70 and to the hinge bracket 90, respectively, to interfere with hinge movement so that the second member is limited to a range of motion between the first position and the second position.

Figure 6:
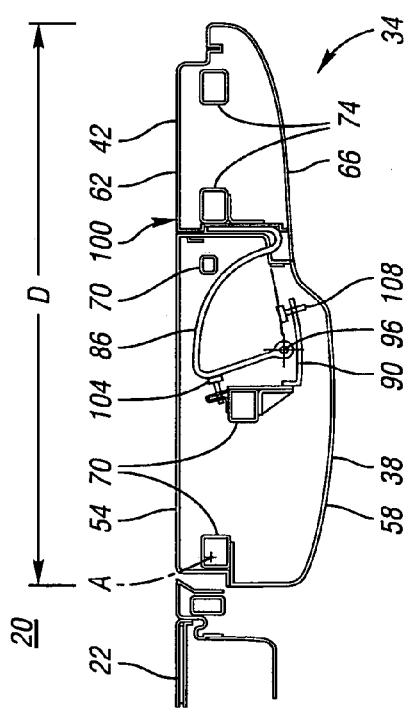
FIG. 6 is a side cross-sectional schematic view of the endgate of FIG. 1 in a fully open position.

Referring to FIG. 6, the endgate 34 is depicted in a fully-open position, in which the lower portion 38 is in an open position and the endgate 34 extends outward so as not to obstruct the endgate opening. The endgate in the fully-open position extends outward from the cargo box a distance D; a user of the pickup truck must reach a distance D to access the cargo box.

Figure 7:
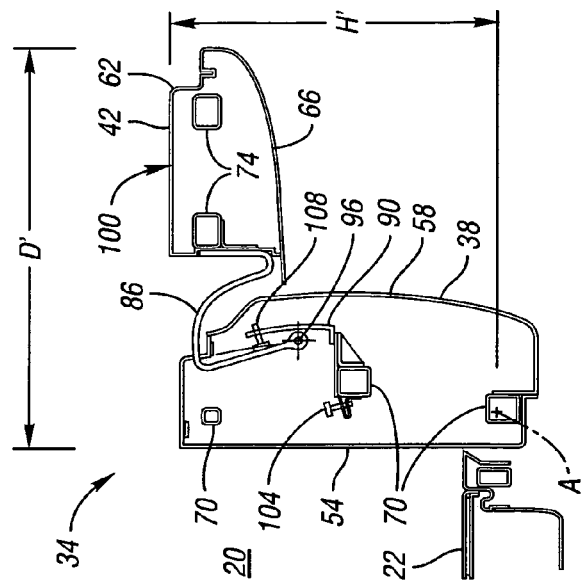
FIG. 7 is a side cross-sectional schematic view of the endgate of FIG. 1 in a partially open position.

Referring to FIG. 7, the endgate 34 is depicted in a partially-open position in which the lower portion 38 is engaged with the strikers (not shown) on the sidewalls (not shown), and the upper portion is in the second position with respect to the lower portion and does not obstruct the endgate opening. The endgate extends outward from the cargo box a distance D', which is less than distance D. Thus, the upper portion is movable with respect to the lower portion to selectively alter the height of the endgate when the lower portion is in the closed position to improve access to the cargo box.

While the best mode for carrying out the invention has been described in detail, those familiar with the art to which this invention relates will recognize various alternative designs and embodiments for practicing the invention within the scope of the appended claims.

What is claimed is:

1. A pickup truck having a cargo box, the pickup truck comprising:
    two cargo box sidewalls at least partially defining an endgate opening;
    an endgate including a lower portion and an upper portion, the lower portion being pivotably mounted with respect to the two sidewalls at the endgate opening for movement between an open position and a closed position, and the upper portion being pivotably connected to the lower portion for movement between a first position and a second position the upper portion having a cross vehicle width equal to a cross vehicle width of the lower portion;
    wherein the upper portion is adjacent to the lower portion and extending upward therefrom in the first position to result in a first endgate height, and wherein the upper portion in the second position is pivoted downward to result in a second endgate height less than the first endgate height and less than a height of the endgate opening.

2. The pickup truck of claim 1, further comprising a striker mounted to one of the lower portion and the upper portion, and a latch mounted on the other of the lower portion and the upper portion and engageable with the striker for selectively rigidly connecting the upper portion to the lower portion.

3. The pickup truck of claim 1, further comprising at least one hinge interconnecting the lower portion and the upper portion.

4. The pickup truck of claim 3, wherein said at least one hinge is a gooseneck hinge.

5. The pickup truck of claim 1, further comprising a striker and an electrically-actuated latch, the latch being engageable with the striker to retain the lower portion in the closed position; and a device operatively connected to the latch to selectively cause disengagement of the latch and the striker.

6. The pickup truck of claim 5, wherein the latch is on the lower portion; wherein the striker is on one of the two sidewalls; and wherein the device is on the upper portion.

7. An endgate for a pickup truck having a cargo box, the endgate comprising:
    a lower portion partially defining the endgate and pivotably mountable with respect to the pickup truck for movement between an open position and a closed position;
    at least one hinge;
    an upper portion pivotably connected to the lower portion by said at least one hinge, having a cross vehicle width equal to a cross vehicle width of the lower portion and further defining the endgate, the upper portion being selectively pivotable with respect to the lower portion between a first position in which the endgate is characterized by a first height and a second position in which the endgate is characterized by a second height different from the first height to facilitate access to the cargo box; and
    a striker mounted to one of the lower portion and the upper portion, and a latch mounted on the other of the lower portion and the upper portion and engageable with the striker for selectively rigidly connecting the upper portion to the lower portion.

8. An endgate for a pickup truck having a cargo box, the endgate comprising:
- a lower portion partially defining the endgate and movably mountable with respect to the pickup truck for movement between an open position and a closed position;
- an upper portion operatively connected to the lower portion and further defining the endgate, the upper portion being selectively movable with respect to the lower portion to alter the height of the endgate when the lower portion is in the closed position to facilitate access to the cargo box; and
- an electric latch operatively connected to the lower portion and configured to selectively engage a striker on the pickup truck body for retaining the lower portion in the closed position; and a device on the upper portion operatively connected to the electric latch to selectively cause the latch to disengage the striker to allow movement of the lower portion to the open position.

9. An endgate for a pickup truck having a cargo box, the endgate comprising:
- a lower portion partially defining the endgate and movably mountable with respect to the pickup truck for movement between an open position and a closed position;
- an upper portion operatively connected to the lower portion and further defining the endgate, the upper portion being selectively movable with respect to the lower portion to alter the height of the endgate when the lower portion is in the closed position to facilitate access to the cargo box; and
- a latch and a striker; wherein the latch is selectively engageable with the striker to prevent the upper portion from moving relative to the lower portion.

10. The endgate of claim 9, wherein the latch is an electric latch on the lower portion; wherein the striker is on the upper portion; and further comprising a device on the upper portion operatively connected to the latch to selectively cause the latch to disengage the striker.

11. An endgate for a pickup truck having a cargo box, the endgate comprising:
- a lower portion partially defining the endgate and movably mountable with respect to the pickup truck for movement between an open position and a closed position;
- an upper portion operatively connected to the lower portion and further defining the endgate, the upper portion being selectively movable with respect to the lower portion to alter the height of the endgate when the lower portion is in the closed position to facilitate access to the cargo box; and
- at least one hinge pivotably interconnecting the upper portion to the lower portion;
- wherein said at least one hinge is a gooseneck hinge pivotably mounted inside the lower portion.

12. The endgate of claim 11, further comprising a stop member sufficiently positioned within the lower portion to restrict movement of the upper portion by interfering with movement of said at least one hinge.

* * * * *